W. S. SEARLES.
OPHTHALMIC MOUNTING.
APPLICATION FILED NOV. 4, 1919.
1,345,029.
Patented June 29, 1920.
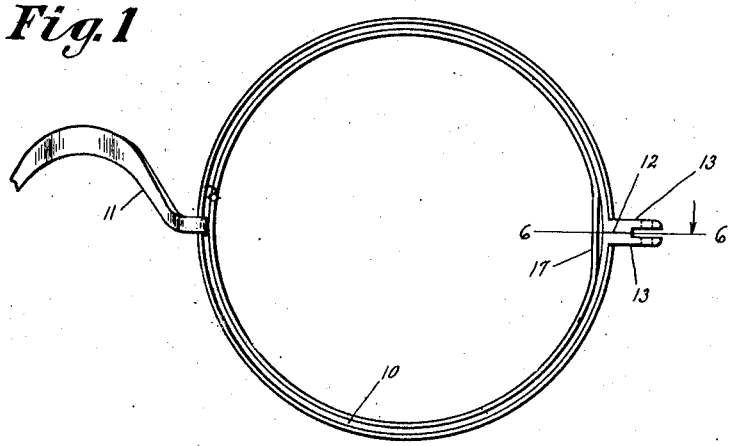
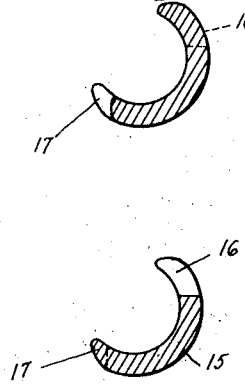
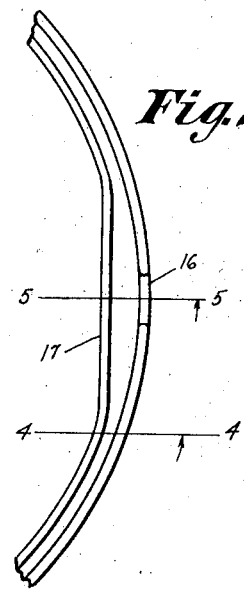
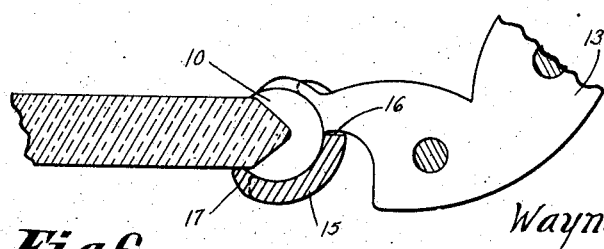
Inventor
Wayne S. Searles.
By Howard E. Barlow
Attorney

UNITED STATES PATENT OFFICE.

WAYNE S. SEARLES, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

OPHTHALMIC MOUNTING.

1,345,029.   Specification of Letters Patent.   Patented June 29, 1920.

Application filed November 4, 1919. Serial No. 335,593.

*To all whom it may concern:*

Be it known that I, WAYNE S. SEARLES, a citizen of the United States, and resident of the city of Providence, in the county of Providence and State of Rhode Island, have invented certain new and useful Improvements in Ophthalmic Mountings, of which the following is a specification.

This invention relates to an improvement in ophthalmic mountings more particularly to a non-metallic rim for a lens frame in such a mounting; and the object of this invention is to provide such a non-metallic rim of a continuous annular band grooved internally to fit over the lens frame, one of the side walls of the rim being notched to receive the end pieces of the frame, and that portion of the rim adjacent said notch being increased in cross sectional area over that of the corresponding portions of the rest of the rim to render the notched portion of the rim as strong if not stronger than that of the rest of the rim.

With these and other objects in view, the invention consists of certain novel features of construction, as will be more fully described, and particularly pointed out in the appended claims.

In the accompanying drawings:

Figure 1— is a rear view of the lens frame showing the outer rim as being wider at the lens frame end pieces than the corresponding portions of the rest of the rim.

Fig. 2— shows a portion of the non-metallic rim removed from the frame, and illustrating the widened section of the wall opposite the notched portion.

Fig. 3— is an edge view of the non-metallic rim showing the same as notched to receive the end pieces of the frame.

Fig. 4— is an enlarged cross section on line 4—4 of Fig. 2, illustrating the general shape of the non-metallic rim and showing the increased width of the rim beyond.

Fig. 5— is a section on line 5—5 of Fig. 2 through the notched portion and also through the opposite widened wall of the rim.

Fig. 6— is a sectional edge view on line 6—6 of Fig. 1, showing the lens mounted in its frame and the non-metallic rim positioned to cover the frame and increased in cross sectional area over that of the corresponding portion of the rest of the rim.

Referring to the drawings, 10 designates one of a pair of the usual metallic lens frames for eyeglass or spectacle mountings which is connected together by the usual nose piece 11, and the outer portion of each frame is usually split or separated at 12 and the ends are provided with so-called end pieces 13 which extend laterally outward from the frame for the purpose of providing means for binding the frame about the lens also to provide a convenient means to which the temples (not shown) may be attached.

The primary object of this invention is to provide the outer rim 15 of shell, xylonite, celluloid, or other suitable non-metallic material and to form this rim into a continuous annular band internally grooved to receive and snap over the lens frame.

It is found in practice to be necessary in some instances to notch the rim as at 16 so as to receive or fit around the end pieces 13. When such a notch is cut or formed in the outer side wall of the rim it naturally weakens the stock at this point which renders the rim liable to be broken.

To obviate this serious difficulty, I have formed the inner side wall 17 of the rim, at a point opposite the outer notched wall, wider than the corresponding portion of the rest of the rim thereby rendering the rim at the notched portion substantially the same strength as at the rest of the rim.

Then again in some cases I form the edge of this widened inner wall of the rim substantially as a chord of an arc of the circle, which construction also serves to stiffen the rim at this point rendering it more rigid and even somewhat stronger than the rest of the rim, which is of particular importance owing to the fact that it is this portion of the rim which receives the pressure necessary for snapping it onto the frame as this is the last portion to be positioned.

My improved rim is very simple and inexpensive in construction and efficient in its operation.

I claim:

1. A non-metallic rim for a lens frame formed of a continuous annular band internally grooved to receive the lens frame, one side wall of the grooved portion being notched to receive the end piece on the frame and that portion of the rim adjacent said notch being increased in cross-sectional area over that of the corresponding portion of the rest of the rim to render the notched portion as strong as that of the balance of the rim.

2. A non-metallic rim for a lens frame formed of a continuous annular band internally grooved to receive the lens frame, one side wall of the grooved portion being notched to receive the end piece on the frame, and the side wall of the rim opposite that of said notch being formed wider for a short distance than the corresponding portion of the rest of the rim to stiffen the rim at the notched portion and render it as strong as that of the balance thereof.

In testimony whereof I affix my signature.

WAYNE S. SEARLES.